Jan. 11, 1938.  F. L. CHASE  2,105,405
SOLDERED JOINT
Filed Feb. 24, 1933

Inventor
Frederic L. Chase,
By Henry Hardman & Isler
Attorneys

Patented Jan. 11, 1938

2,105,405

UNITED STATES PATENT OFFICE 2,105,405

SOLDERED JOINT

Frederic L. Chase, Dayton, Ohio, assignor, by mesne assignments, to General Motors Corporation, a corporation of Delaware Application February 24, 1933, Serial No. 658,401

3 Claims. (Cl. 285—106)

This invention relates particularly to the soldering together of parts made of non-ferrous metals containing copper, wherever they occur, and particularly in refrigerating systems, so that the soldered joint shall be corrosion resistant and be relatively cheap.

Heretofore it has been suggested to solder various portions of refrigerating apparatus or the like with silver solders in order that the soldered joint shall be corrosion resistant. Silver alloys, as heretofore used, are relatively expensive and have a relatively high melting point. I have discovered that a tin antimony solder substantially in the proportions of 95% tin and 5% antimony has many of the advantages of the silver solder, particularly with respect to its corrosion resistant properties and its relatively high tensile strength even near its melting point, and yet is relatively cheap and does not require such relatively high temperature to perform the soldering operation.

Further objects and advantages of the present invention will be apparent from the following description, reference being had to the accompanying drawing, wherein a preferred form of the present invention is clearly shown.

Figure 1:
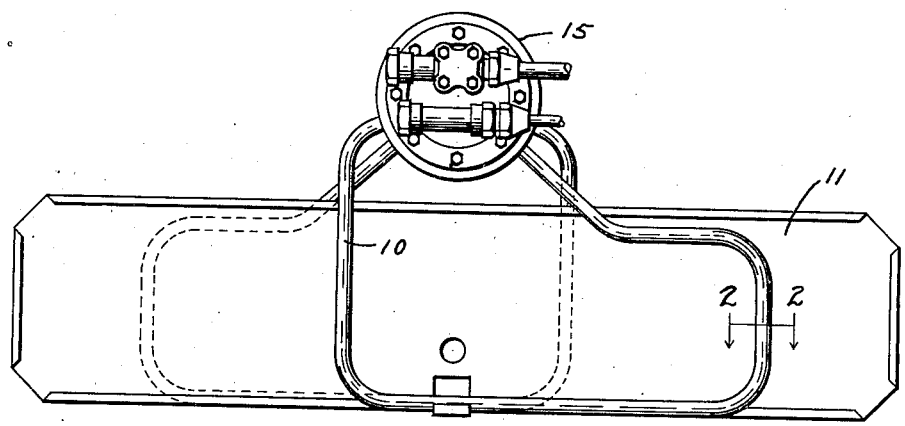
Fig. 1 shows one type of refrigerating apparatus to which my invention may be applied.
Figure 2:
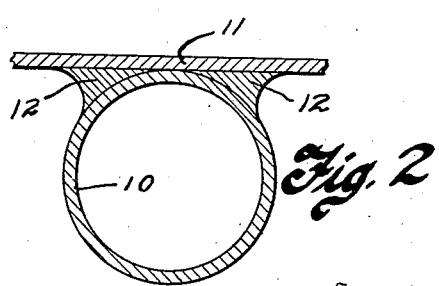
Fig. 2 is an enlarged cross sectional view taken along the line 2—2 of Fig. 1.

In Figs. 1 and 2 there is shown a copper pipe 10 to which a brass or copper fin 11 is to be soldered and the same may be soldered with the tin antimony solder 12 of substantially the proportions indicated above. In order to perform the soldering operation, it is preferable to clean the surfaces thoroughly and then to apply a flux of the zinc chloride and ammonium chloride type, thereafter to apply the solder to secure the fin to the tube.

Figure 3:
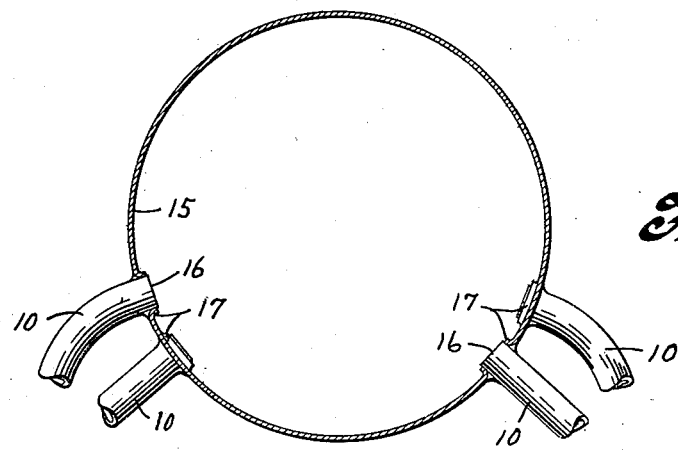
Fig. 3 is an enlarged view of a portion of the apparatus shown in Fig. 1, and indicates another soldered joint embodying my invention.
Figure 4:
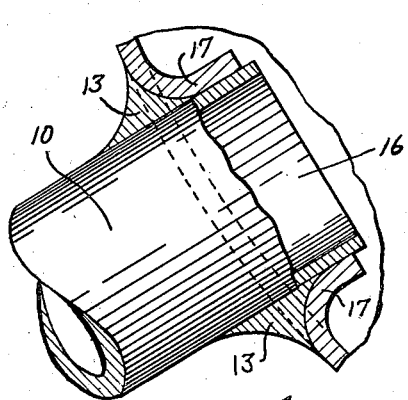
Fig. 4 is an enlarged cross sectional view of a portion of Fig. 3.

In Figs. 3 and 4 the header 15, shown in Fig. 1, is shown on an enlarged scale. The header 15 is generally cylindrical and may be made of brass. Along the bottom, two or more rows of openings 16 are formed by striking inwardly the flanges 17. Within these flanges the copper tubes 10 may be inserted and soldered thereto with my improved solder substantially as described above.

I have discovered that the tin antimony alloy of substantially 95% tin and 5% antimony is particularly corrosion resistant and is quite ductile and not likely to break on account of brittleness. Furthermore, in solidifying, the alloy first forms a slush of solid and liquid which, because of its low fluidity, permits the formation of a large and strong fillet 13 in the soldering operation. This slush, I now believe, is due to the formation of the alpha-phase of the alloy, so that at first there are solid particles formed in the liquid containing approximately 10% or 12% antimony and 90% or 88% tin; and as the temperature falls further, other solid particles are formed which are less rich in antimony until finally the entire alloy solidifies after having formed the fillet because of the slush-like formation during solidification.

I find that this solder is superior to substantially pure tin, because tin fails to form a fillet and solidifies at a constant fixed temperature and is so fluid prior to solidification that no metal is retained at the joint to form the fillet.

While I have indicated that the most desirable percentage is 95% tin, 5% antimony, it is to be understood that this percentage may be varied and that the benefits of my invention may be obtained in varying degrees in accordance with variations in the proportions of the constituents. Thus if the percentage of antimony is increased, the general solidifying temperature is raised accordingly, and to a certain extent, particularly if the percent of antimony is increased to the point where phases other than the alpha-phase are solidified, the solder is rendered more brittle. Also the percentage of antimony may be decreased; but, in so doing, the temperature range and the amount of slush formation is generally decreased, with a slight drop in the general solidifying temperature; and this therefore decreases the power to form the fillet. I have also found that an increase in the percentage of antimony decreases the corrosion resistance of the solder. Therefore, while the percentages of the constituents may be varied greatly. I prefer to use such percentages that the alpha-phase of the alloy only is formed during the solidification of the solder, and these percentages I now find to be those in which the antimony content is substantially 10% or less.

While the form of embodiment of the invention as herein disclosed, constitutes a preferred form, it is to be understood that other forms might be adopted, all coming within the scope of the claims which follow.

What is claimed is as follows:

1. A soldered joint on a cooling unit of a refrigerating system comprising a copper pipe and a copper containing fin soldered thereto with a tin-antimony solder containing at least 90% tin and not more than 10% antimony.

2. A soldered joint on a cooling unit of a refrigerating system comprising means forming a refrigerant circulating passageway and including copper containing walls soldered to copper containing members with tin-antimony solder containing at least 90% tin and not more than 10% antimony.

3. A soldered joint on a cooling unit of a refrigerating system comprising means forming a refrigerant circulating passageway and including copper containing walls soldered to copper containing members with tin-antimony solder having substantially 95% tin and 5% antimony.

FREDERIC L. CHASE.